United States Patent
Lu et al.

(10) Patent No.: US 8,543,544 B2
(45) Date of Patent: Sep. 24, 2013

(54) CHECKPOINT BASED PROGRESSIVE BACKUP

(75) Inventors: Frank Lu, San Jose, CA (US); James Qiu, Santa Clara, CA (US); Jonathan Thatcher, Mountain View, CA (US); Murali Vemulapati, Santa Clara, CA (US); Carl Wang, Cupertino, CA (US); Terrence Barwegen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/345,584

(22) Filed: Jan. 6, 2012

(65) Prior Publication Data

US 2013/0179401 A1  Jul. 11, 2013

(51) Int. Cl.
*G06F 7/00* (2006.01)
*G06F 17/00* (2006.01)

(52) U.S. Cl.
USPC .......................................... 707/634; 707/649

(58) Field of Classification Search
None
See application file for complete search history.

(56) References Cited

U.S. PATENT DOCUMENTS

| | | | |
|---|---|---|---|
| 6,581,075 B1* | 6/2003 | Guturu et al. | 1/1 |
| 2006/0004839 A1* | 1/2006 | Nagasawa et al. | 707/102 |
| 2006/0235909 A1* | 10/2006 | Oks et al. | 707/204 |
| 2007/0179973 A1* | 8/2007 | Brodie et al. | 707/104.1 |
| 2007/0226438 A1* | 9/2007 | Erofeev | 711/162 |
| 2008/0256140 A1* | 10/2008 | Lazzaro et al. | 707/203 |
| 2009/0287749 A1* | 11/2009 | Yatabe et al. | 707/204 |
| 2010/0131468 A1* | 5/2010 | Thakore | 707/624 |
| 2011/0196836 A1* | 8/2011 | Kesselman | 707/634 |
| 2011/0307449 A1* | 12/2011 | Cargille et al. | 707/648 |
| 2012/0117342 A1* | 5/2012 | Karonde et al. | 711/162 |

* cited by examiner

*Primary Examiner* — Hung T Vy
*Assistant Examiner* — Tuan A Pham
(74) *Attorney, Agent, or Firm* — Fish & Richardson P.C.

(57) ABSTRACT

Methods, program products, and systems for checkpoint based progressive backup are described. When a system receives a request to update a page of a storage device storing database files of a database, the system can update the page and replicate the updated page in a shadow page in a backup queue. The backup queue can store multiple shadow pages, where each updated page can correspond to at most a specified number of shadow pages in the queue. Each shadow page can be associated with a timestamp of a latest update. At pre-specified temporal checkpoints, the system can write the shadow pages in the queue to a backup file in the order of the timestamps. Upon receiving a restoration request, the system can restore the database to a state as of the time of the checkpoint using the backup file.

20 Claims, 6 Drawing Sheets

CHECKPOINT BASED PROGRESSIVE BACKUP

TECHNICAL FIELD

This disclosure relates generally to data backup technologies.

BACKGROUND

A database management system (DBMS) can use transaction control in incremental or progressive backups. In a progressive backup, a system can use shadow pages and "copy-on-write" (COW) technologies to manage the backup when multiple processes update a same data item. In a system using COW technologies, when multiple processes update a data item, a private copy of the data item is created for each process that modifies the data item. The modification can occur at the private copy of the data item. The changes made by one process may be invisible to other processes. If a process accesses the data item without modifying the data item, a private copy need not be created. Accordingly, the number of shadow pages created at a given time for a data item can be proportional to the number of processes modifying the data item at the given time.

SUMMARY

Methods, program products, and systems for checkpoint based progressive backup are described. When a system receives a request to update a page of a storage device storing database files of a database, the system can update the page and replicate the updated page in a shadow page in a backup queue. The backup queue can store multiple shadow pages, where each updated page can correspond to at most a specified number of shadow pages in the queue. Each shadow page can be associated with a timestamp of a latest update. At pre-specified temporal checkpoints, the system can write the shadow pages in the queue to a backup file in the order of the timestamps. Upon receiving a restoration request, the system can restore the database to a state as of the time of the checkpoint using the backup file.

The techniques described in this specification can be utilized to achieve the following advantages. Compared to conventional COW techniques, the checkpoint based progressive backup can reduce overhead of shadow page management. A page will not have to be copied into a separate shadow page for every process updating the page. Accordingly, the system can avoid generating numerous shadow pages for a frequently updated page (a hot spot). The checkpoint based progressive backup can guarantee that a backup of a database keeps a valid full backup no older than a user-specified checkpoint period. The checkpoint based progressive backup can use hard or symbolic links between a "last good" and an "in-progress" copy to reduce the amount of copying when backing up large multimedia files.

The details of one or more implementations of checkpoint based progressive backup are set forth in the accompanying drawings and the description below. Other features, aspects, and advantages of checkpoint based progressive backup will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
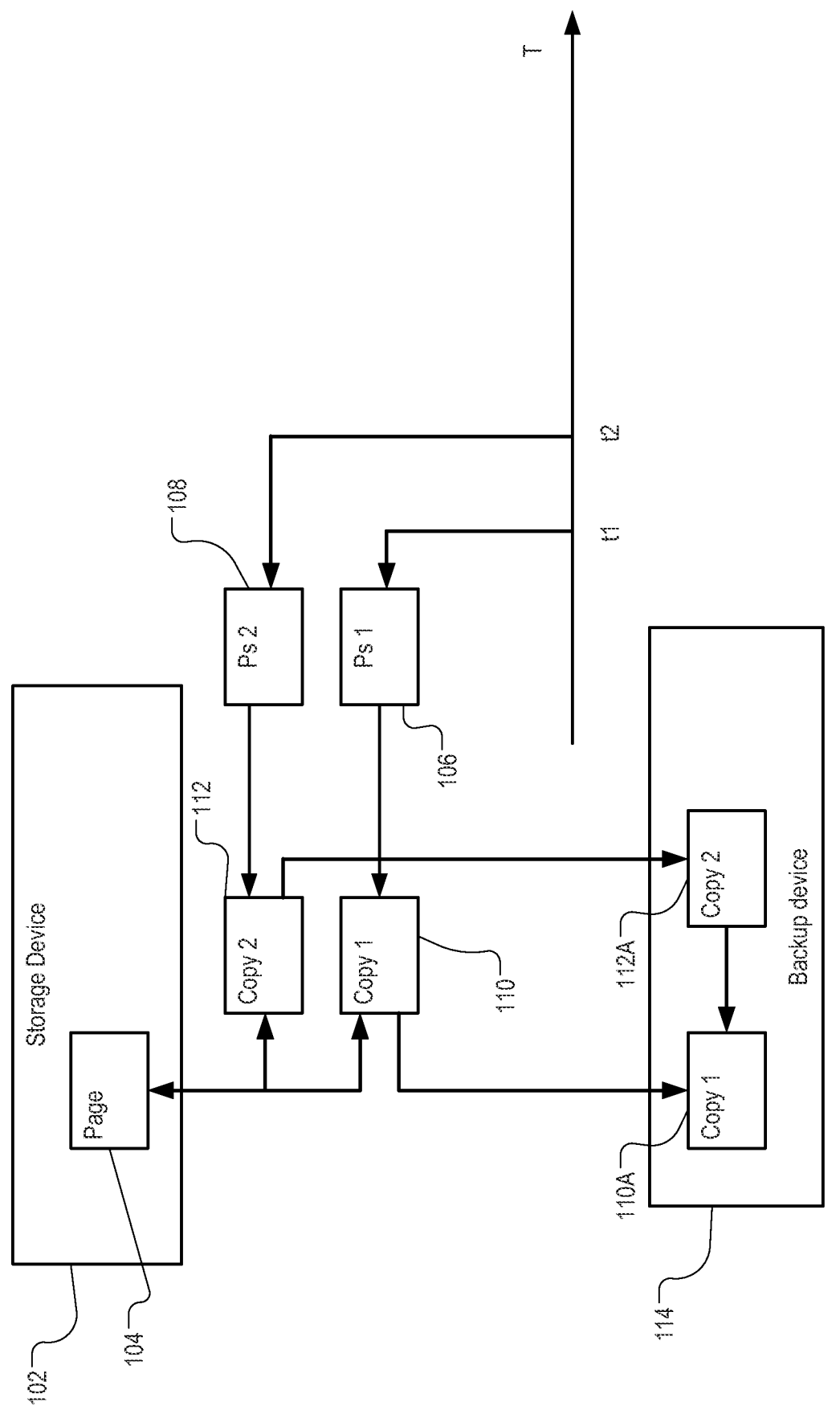
FIG. 1 is a block diagram illustrating a conventional progressive backup system.

FIG. 1 is a block diagram illustrating a conventional progressive backup system. Data can be stored on storage device 102 in page 104. Page 104 can be a fixed-length or variable-length contiguous block of memory designated as a unit for storing data. The conventional progressive backup system can use shadow pages and "copy-on-write" (COW) technologies to manage the backup.

Process 106 and process 108 can update the data stored in page 104 at time t1 and t2, sequentially. Upon determining that process 106 ("Ps 1") will update the data, the system can create shadow page 110. Shadow page 110 can be a storage unit separate from page 104. Shadow page 110 can contain a copy of the data stored in page 104. Process 106 can perform the update on page 104 and copy the update of page 104 into its shadow page 110. Likewise, upon determining that process 108 ("Ps 2") will update the data, the system can create shadow page 112, and allow process 108 to copy the update of page 104 into shadow page 112. Every change to page 104 can be kept in a corresponding shadow page. If there are two updates to page 104 at t1 and t2, respectively, the system can create two shadow pages 110 and 112 corresponding to timestamps t1 and t2, respectively, in the flushing queue.

The system can make backups offline, e.g., when no process is updating the data stored in page 104 and other pages. Alternatively, the system can make live incremental updates, where each of shadow page 110 and shadow page 112 is backed up. Shadow page 110 and shadow page 112 can be stored as page 110A and page 112A, respectively, on backup storage device 114. The system can use page 112A to overwrite page 110A such that latest update of the page is maintained in the backup copy.

When the time period between updates, e.g., t2-t1, is short, or when numerous processes update the data stored in page 104 at the same time, the system can create multiple shadow pages. The multiple shadow pages may lead to multiple and frequent updates during backup.

Figure 2:
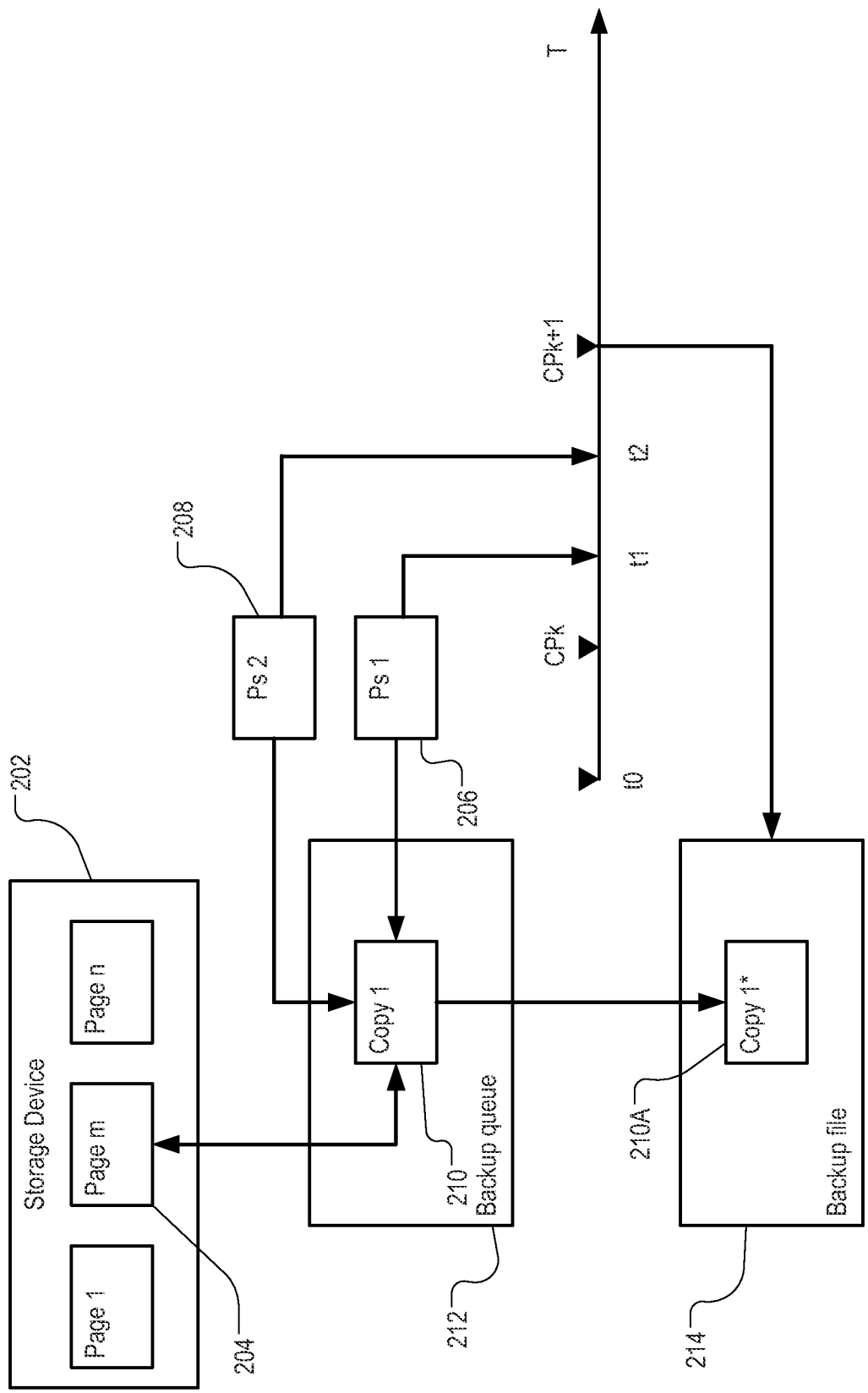
FIG. 2 is a block diagram illustrating exemplary operations of checkpoint based progressive backup.

FIG. 2 is a block diagram illustrating exemplary operation checkpoint based progressive backup. A system implementing the operations can utilize a configurable checkpoint interval tc. The system can define multiple temporal checkpoints from a time t0. The system can be configured to generate no more than a specified number (e.g., one) of shadow pages per memory page during each checkpoint interval between two checkpoints. The system can allow multiple updates on a same shadow page until a next checkpoint arrives.

For example, the system can include storage device 202. Data (e.g., database content) can be stored in pages of storage device 202. For illustrative purposes, the data are stored in N pages P1, P2 ... Pn. The system can receive one or more requests to update page 204, the mth page among the N pages.

The system can start operations from a randomly designated time t0. The system can have the following exemplary temporal checkpoints:

$$CP1=t0+1*tc, CP2=t0+2*tc \ldots CPk=t0+k*tc, CPk+1=t0+(k+1)*tc, \quad (1)$$

where tc is the checkpoint interval, and CPk is the kth checkpoint. The checkpoint interval tc can be adjusted to correspond to a frequency of update. For example, a length of the checkpoint interval tc can be inversely proportional to the frequency of update.

The system can receive a first request to update page 204 from process 206 at time t1. The system can receive a second request to update page 204 from process 208 at time t2, where t1<t2. Both time t1 and time t2 are between two neighboring checkpoints CPk and CPk+1 (not drawn to scale in FIG. 2). The system can update page 204 according to the first request. The system can generate shadow page 210 upon receiving the request from process 206 at time t1, if this request is the first request received after checkpoint CPk. The shadow page 210 can include a copy of the data stored in page 204 that have been updated according to the first request.

When the system receives the second request from process 208, the system can update the data stored in page 204 according to the second request. If a conflict exists between the updates of the first and second request, the update made at a later time (t2) can overwrite the update made at an earlier time (t1). The system can generate a copy of the data stored in page 204 that have been updated according to the second request. The system can store the copy of data in shadow page 210, overwriting the previous copy.

The system can store shadow page 210 in backup queue 212. Shadow page 210 can be associated with a timestamp, e.g., t2, that indicates a time of the last update. Backup queue 212 can include multiple shadow pages. Each shadow page can correspond to a page of the N pages of storage device 202. Each page of pages P1 ... Pn of storage device 202 can correspond to at most M shadow pages in backup queue 212, where M is a pre-specified number greater than or equal to one.

At a next checkpoint, e.g., CPk+1, the system can copy the shadow page 210, which is associated with timestamp t2, and other shadow pages associated with timestamps between CPk and CPk+1, to backup file 214. Backup file 214 can be a log file that includes data or references to data that can be used to restore the data stored in the N pages of storage device 202 to a state as of the time CPk+1. Backup file 214 can include shadow page copy 210A, which stores data of shadow page 210 at time of temporal checkpoint CPk+1.

Exemplary Procedure of Checkpoint Based Progressive Backup

Figure 3:
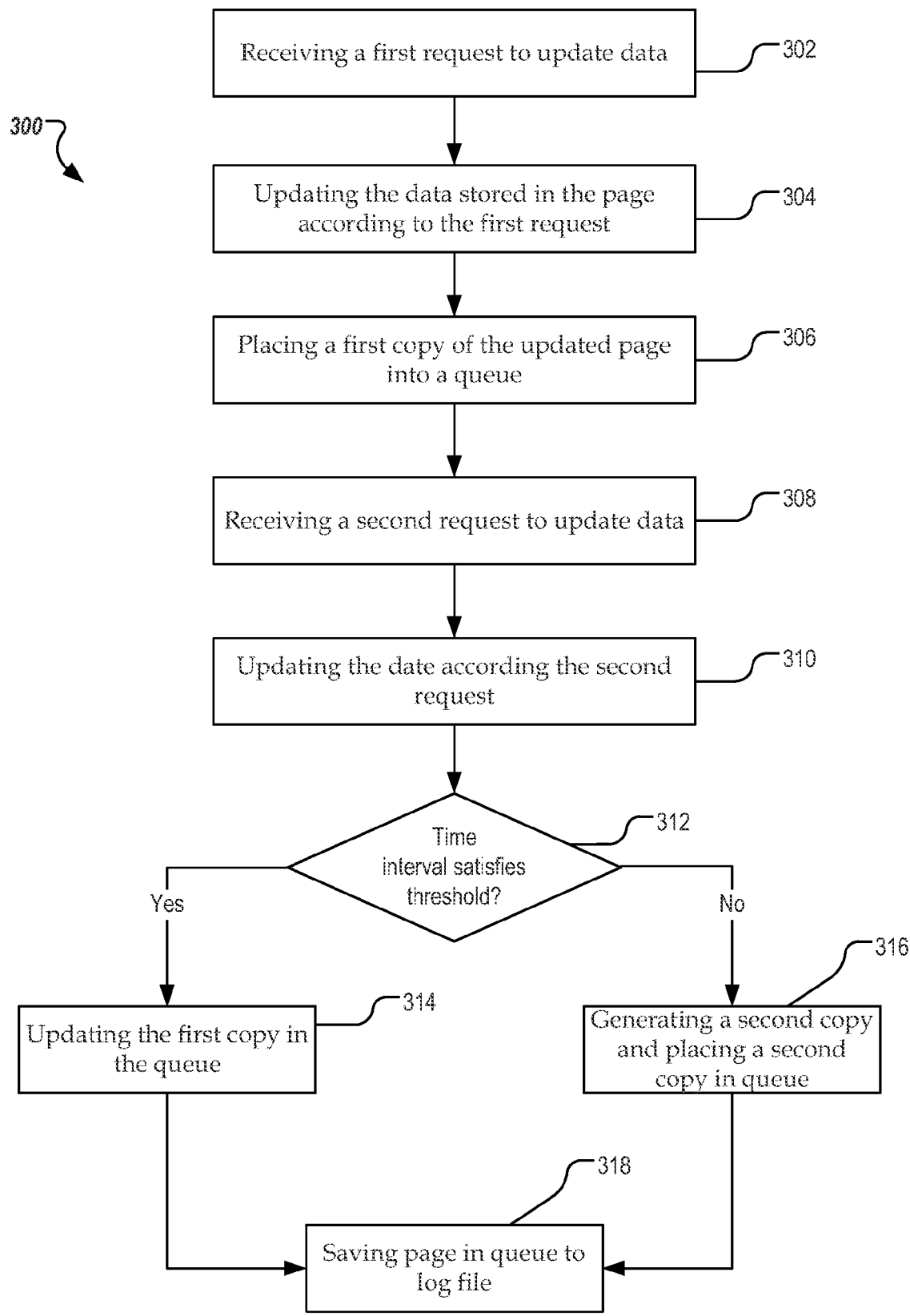
FIG. 3 is a flowchart illustrating an exemplary procedure of checkpoint based progressive backup.

FIG. 3 is a flowchart illustrating exemplary procedure 300 of checkpoint based progressive backup. A system can receive (302) a first request to update data stored in a page of a storage device. The page can be stored in a page set of multiple pages. Each of the pages can include a portion of a database file, an entire database file, or multiple database files.

In response to the first request, the system can update (304) the data stored in the page according to the first request. In response to the first request, the system can place (306) a first copy of the updated page into a queue (e.g., backup queue 212 of FIG. 2). The system can receive (308) a second request to update the data stored in the page. The second request can be received after the system received the first request.

The system can update (310) the data stored in the page according to the second request. The system can determine a series of temporal checkpoints from a starting time. Each two neighboring checkpoints in the series can be separated by a threshold time period that is configurable according to a frequency of the data update. Two pages that are updated at different frequencies can have the same or different threshold time periods. Updating the data stored in the page according to the second update can occur in a time period between two neighboring checkpoints.

The system can determine (312) whether a time interval between receiving the first update and receiving the second update satisfies a threshold time period. The system can determine that the threshold time period is satisfied when the first update request is received between two neighboring checkpoints and the second update request is received between the same two neighboring checkpoints.

If the time interval between receiving the first update and receiving the second update satisfies the threshold time period, the system can update (314) the data stored in the copy in the queue according to the second update request. Updating the data stored in the copy in the queue according to the second update request can occur in the time period between the same two neighboring checkpoints. Updating the data stored in the copy in the queue can include replicating the data from the page, now already updated according to the second request, into the copy in the queue.

If the time interval between receiving the first update and receiving the second update does not satisfy, e.g., exceeds, the threshold time period, the system can generate (316) a second copy of the page that has been updated according to the second request, and place the second copy in the queue. The queue can include one or more copies of pages, each copy including a latest update for each page in a time period, the copy being associated with a timestamp of the latest update on data stored in the copy.

Upon reaching a next temporal checkpoint, the system can save (318) one or more pages in the queue to a log file in a sequence according to the timestamp associated with each page. The system can then remove at least a portion of the one or more saved pages from the queue. The log file can be a backup file. The system can reconstruct data stored in the page on the storage device to a state as of the checkpoint, according to the log file.

Exemplary Backup Queue

Figure 4:
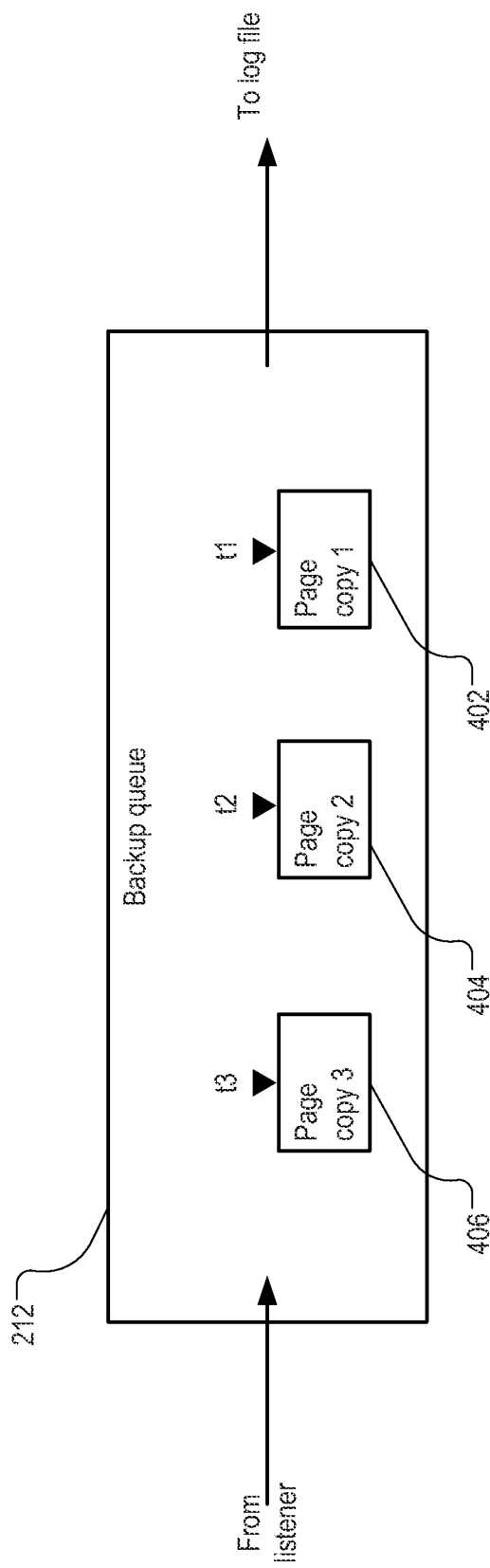
FIG. 4 is a block diagram illustrating an exemplary structure of a backup queue for checkpoint based progressive backup.

FIG. 4 is a block diagram illustrating an exemplary structure of backup queue 212 for checkpoint based progressive backup. Backup queue 212 can be a first in, first out (FIFO) data structure storing shadow pages 402, 404, and 406. Each of shadow pages 402, 404, and 406 can be a copy of a page of a storage device storing database files.

A backup listener can receive a request to update a page of the storage device storing database files. The backup listener can update the page of the storage device storing database files. If the page has been updated earlier within a same update time period, and a shadow page already exists in backup queue 212, the backup listener can update the shadow page according to the request. If the shadow page does not exist in backup queue 212, the backup listener can make a copy of the updated page and place the copy in backup queue 212. Each page of the storage device storing database files can have at most M corresponding shadow pages in backup queue 212, where M is an integer greater than or equal to one.

Each of the shadow pages 402, 404, and 406 can be associated with a timestamp t1, t2, or t3, respectively. Timestamps t1, t2, and t3 can indicate the time when the last update to the respective shadow page occurred.

Upon each temporal checkpoint, the system can store shadow pages 402, 404, and 406 in a log file. Shadow pages 402, 404, and 406 can be stored in a log file in the order of the timestamp, the oldest one first. After the system stores shadow pages 402, 404, and 406 in the log file, the system can remove shadow pages 402, 404, and 406 from backup queue 212.

Exemplary Database Backup Processes

Figure 5:
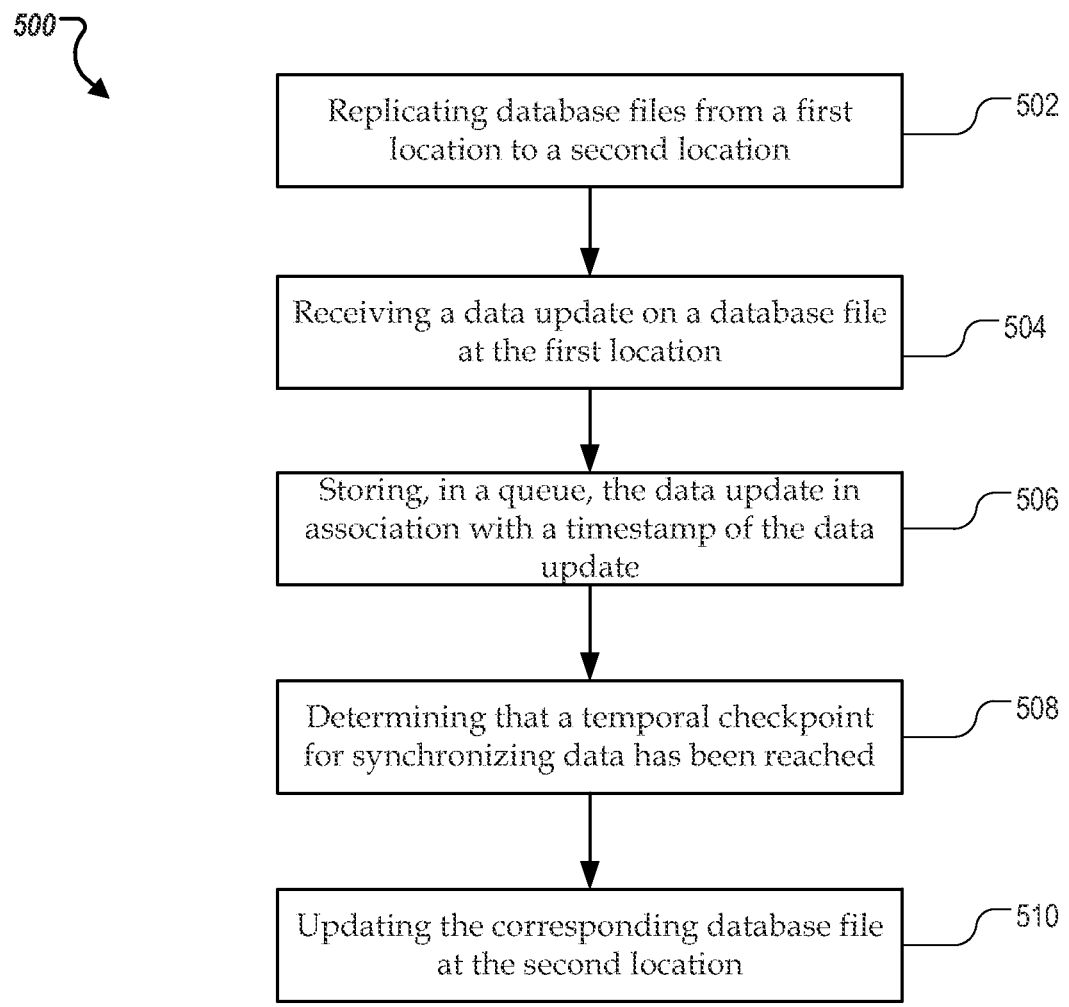
FIG. 5 is a flowchart of an exemplary procedure for backing up a database.

FIG. 5 is a flowchart of exemplary procedure 500 for backing up a database. A system implementing the checkpoint based progressive backup techniques can replicate (502) database files of the database from a first location to a second location. The database files can be stored as a page set that includes multiple pages. Each page can include a portion of a database file, an entire database file, or multiple database files.

The system can receive (504) a data update on a database file at the first location. The data update can be a response to a data update request. The database file can include data having a text type, a number type, or a container data type. The data having the container data type can include one or more references to the newly added multimedia data or data objects stored separately from other database files or the full path information for the deleted satellite files.

The system can store (506), in a queue, the data update in association with a timestamp of the data update without updating the corresponding data file at the second location. The queue can be a FIFO data structure, e.g., backup queue 212 of FIG. 2.

The system can determine (508) that a temporal checkpoint for synchronizing data has been reached. A temporal checkpoint can be a time marker. A time period between two temporal checkpoints can be specified based on a frequency that data update requests received in the past. When the system receives data update requests more frequently, the system can use a short time period between two checkpoints.

The system can update (510) the corresponding database file at the second location, in an order determined by the timestamp and the queue, such that the data update is synchronized between the first location and the second location. In some implementations, upon determining that the temporal checkpoint has been reached, the system can update all copies of database files at the second location whose original files were updated at the first location between a last previous temporal checkpoint and the temporal checkpoint. Updating the corresponding database file at the second location can occur at a page level. When the data being updated include additions or deletions of container data, the system can copy or delete the multimedia data file referred by the container data.

Exemplary System Architecture

Figure 6:
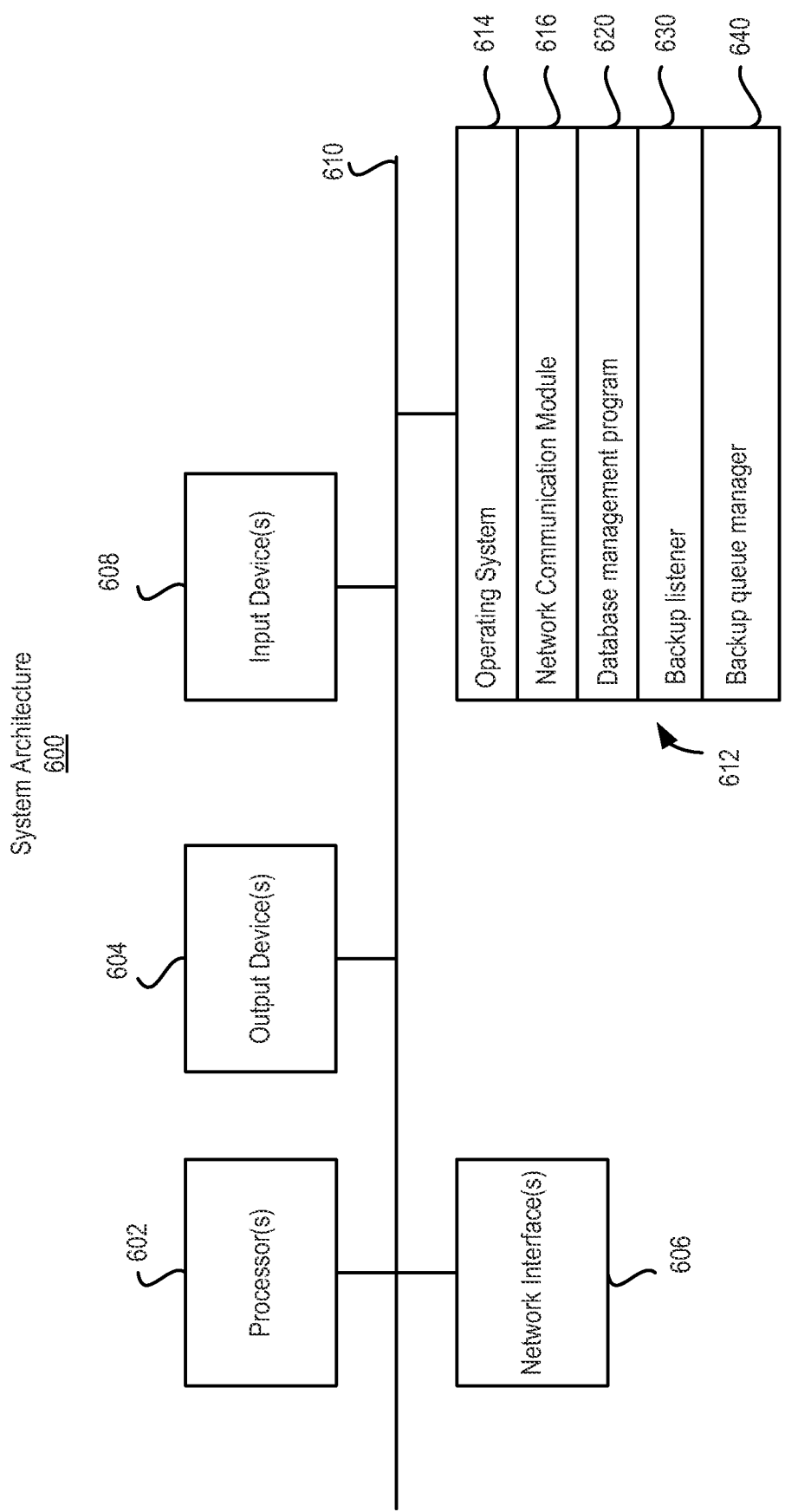
FIG. 6 is a block diagram of an exemplary system architecture for implementing the features and operations of FIGS. 1-5.

FIG. 6 is a block diagram of an exemplary system architecture 600 for implementing the features and operations of FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., Mac OS® server, Windows® NT server), network communication module 616, database management program 620, backup listener 630, and backup queue manager 640. Operating system 614 can be multi-user, multiprocessing, multitasking, multithreading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.).

Database management program 620 can include computer instructions that, when executed, cause processor 602 to perform operations of database backup and restoration. Database management program 620 can include interfaces to one or more databases on a file system. The databases can be organized under a hierarchical folder structure, the folders mapping to directories in the file system. Backup listener 630 can include computer instructions that, when executed, cause processor 602 to listen to database update requests, identifying a current "in-progress" copy to modify, creating shadow pages, and inserting the shadow pages in a backup queue. Backup queue manager 640 can computer instructions that, when executed, cause processor 602 to write pages in a queue to a backup file, and remove the pages written to the backup file.

Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention. For instance, although most examples are described in reference an HTTP streaming protocol, the techniques described can be applied to any data exchange protocol.

What is claimed is:

1. A method comprising:
designating, by one or more processors, a first temporal checkpoint and a checkpoint interval, wherein after each checkpoint interval, a new temporal checkpoint is designated;
at a time after the first temporal checkpoint, receiving, by the one or more processors, a first update request to update data stored in a page of a storage device, wherein the page is a contiguous block of memory designated as a unit for storing data;
determining, by the one or more processors, a first update action based on whether a prior update request was received between the first temporal checkpoint and time the first update request was received, wherein:
when no prior update request was received, the first update action comprises:
updating the data stored in the page according to the first update request; and placing a first copy of the updated page into a queue; and
when a prior update request was received, the first update action comprises updating a prior copy of the page stored in the queue according to the first update request;
receiving a second update request to update the data stored in the page; and
determining, by the one or more processors, a second update action based on whether a time threshold is satisfied, the time threshold being satisfied when receiving the first update request and receiving the second update request occurred between two neighboring temporal checkpoints separated by a checkpoint interval, wherein:

when the time threshold is not satisfied, the second update action comprises:
updating data stored in the page according to the second update request; generating a second copy of the page as updated according to the second update request; and placing the second copy of the updated page into the queue; and
when the time threshold is satisfied, the second update action comprises updating the first copy of the page stored in the queue according to the second update request.

2. The method of claim 1, wherein the block of memory of the page has a fixed-length or variable-length.

3. The method of claim 1, wherein the checkpoint interval is adjustable to correspond to a frequency of update.

4. The method of claim 1, wherein:
the queue comprises one or more copies of pages, each copy including a latest update for each page in a time period, the copy being associated with a timestamp of the latest update on data stored in the copy.

5. The method of claim 4, comprising:
upon reaching the new temporal checkpoint, saving one or more pages in the queue to a log file in a sequence according to the timestamp associated with each page; and
removing at least a portion of the one or more saved pages from the queue.

6. The method of claim 5, comprising:
reconstructing data stored in the page on the storage device to a state at the checkpoint according to the log file.

7. The method of claim 1, wherein the page is stored in a page set comprising a plurality of pages, each of the plurality of pages including a portion of a database file, an entire database file, or multiple database files.

8. A non-transitory storage medium storing instructions operable to cause one or more processors to perform operations comprising:
designating a first temporal checkpoint and a checkpoint interval, wherein after each checkpoint interval, a new temporal checkpoint is designated;
at a time after the first temporal checkpoint, receiving a first update request to update data stored in a page of a storage device, wherein the page is a contiguous block of memory designated as a unit for storing data;
determining a first update action based on whether a prior update request was received between the first temporal checkpoint and time the first update request was received, wherein:
when no prior update request was received, the first update action comprises:
updating the data stored in the page according to the first update request; and
placing a first copy of the updated page into a queue; and
when a prior update request was received, the first update action comprises updating a prior copy of the page stored in the queue according to the first update request;
receiving a second update request to update the data stored in the page; and
determining a second update action based on whether a time threshold is satisfied, the time threshold being satisfied when receiving the first update request and receiving the second update request occurred between two neighboring temporal checkpoints separated by a checkpoint interval, wherein:
when the time threshold is not satisfied, the second update action comprises: updating data stored in the page according to the second update request; generating a second copy of the page as updated according to the second update request; and placing the second copy of the updated page into the queue; and
when the time threshold is satisfied, the second update action comprises updating the first copy of the page stored in the queue according to the second update request.

9. The medium of claim 8, wherein the block of the page has a fixed-length or variable-length.

10. The medium of claim 8, wherein the checkpoint interval is adjustable to correspond to a frequency of update.

11. The medium of claim 8, wherein:
the queue comprises one or more copies of pages, each copy including a latest update for each page in a time period, the copy being associated with a timestamp of the latest update on data stored in the copy.

12. The medium of claim 11, the operations comprising:
upon reaching the new temporal checkpoint, saving one or more pages in the queue to a log file in a sequence according to the timestamp associated with each page; and
removing at least a portion of the one or more saved pages from the queue.

13. The medium of claim 12, the operations comprising:
reconstructing data stored in the page on the storage device to a state at the checkpoint according to the log file.

14. The medium of claim 8, wherein the page is stored in a page set comprising a plurality of pages, each of the plurality of pages including a portion of a database file, an entire database file, or multiple database files.

15. A system, comprising:
one or more processors configured to perform operations comprising:
designating a first temporal checkpoint and a checkpoint interval, wherein after each checkpoint interval, a new temporal checkpoint is designated;
at a time after the first temporal checkpoint, receiving a first update request to update data stored in a page of a storage device wherein the page is a contiguous block of memory designated as a unit for storing data;
determining a first update action based on whether a prior update request was received between the first temporal checkpoint and time the first update request was received, wherein:
when no prior update request was received, the first update action comprises:
updating the data stored in the page according to the first update request; and
placing a first copy of the updated page into a queue; and
when a prior update request was received, the first update action comprises updating a prior copy of the page stored in the queue according to the first update request;
receiving a second update request to update the data stored in the page; and
determining, by the one or more processors, a second update action based on whether a time threshold is satisfied, the time threshold being satisfied when receiving the first update request and receiving the second update request occurred between two neighboring temporal checkpoints separated by a checkpoint interval, wherein:
when the time threshold is not satisfied, the second update action comprises: updating data stored in the page according to the second update request; generating a second copy of the page as updated according to the second update request; and placing the second copy of the updated page into the queue; and when the time threshold is satisfied, the second update action comprises updating the first copy of the page stored in the queue according to the second update request.

16. The system of claim 15, wherein the checkpoint interval is adjustable to correspond to a frequency of update.

17. The system of claim 15, wherein the queue comprises one or more copies of pages, each copy including a latest update for each page in a time period, the copy being associated with a timestamp of the latest update on data stored in the copy.

18. The system of claim 17, the operations comprising:
upon reaching the new temporal checkpoint, saving one or more pages in the queue to a log file in a sequence according to the timestamp associated with each page; and removing at least a portion of the one or more saved pages from the queue.

19. The system of claim 18, the operations comprising:
reconstructing data stored in the page on the storage device to a state at the checkpoint according to the log file.

20. The system of claim 15, wherein the page is stored in a page set comprising a plurality of pages, each of the plurality of pages including a portion of a database file, an entire database file, or multiple database files.

* * * * *